United States Patent
Minashima et al.

(10) Patent No.: US 7,431,762 B2
(45) Date of Patent: Oct. 7, 2008

(54) PROCESS FOR PRODUCING DICHLORODIKETOPYRROLOPYRROLE PIGMENT OF THE α MODIFICATION, DICHLORODIKETOPYRROLOPYRROLE PIGMENT OF THE α MODIFICATION PRODUCED BY THE PROCESS, AND COLORING COMPOSITION USING THE SAME

(75) Inventors: Hidenori Minashima, Tokyo (JP); Nobuyuki Tomiya, Tokyo (JP); Taro Murohoshi, Tokyo (JP)

(73) Assignee: Toyo Ink Mfg. Co., Ltd., Tokyo (JP)

( * ) Notice: Subject to any disclaimer, the term of this patent is extended or adjusted under 35 U.S.C. 154(b) by 0 days.

(21) Appl. No.: 11/826,864

(22) Filed: Jul. 19, 2007

(65) Prior Publication Data
US 2008/0022902 A1  Jan. 31, 2008

(30) Foreign Application Priority Data
Jul. 24, 2006  (JP) ............................ 2006-200944

(51) Int. Cl.
C09B 67/04 (2006.01)
C09B 67/10 (2006.01)
C09B 67/20 (2006.01)
C09B 67/22 (2006.01)
C09B 67/48 (2006.01)
C07D 487/04 (2006.01)
C08K 5/00 (2006.01)

(52) U.S. Cl. ................. 106/498; 106/493; 106/499; 548/453

(58) Field of Classification Search ............. 106/493, 106/498, 499; 548/453
See application file for complete search history.

(56) References Cited

U.S. PATENT DOCUMENTS

| | | | | |
|---|---|---|---|---|
| 4,415,685 A | * | 11/1983 | Iqbal et al. | 524/92 |
| 4,579,949 A | * | 4/1986 | Rochat et al. | 546/167 |
| 5,591,865 A | * | 1/1997 | Hao et al. | 548/453 |
| 5,646,299 A | * | 7/1997 | Hao et al. | 548/453 |
| 5,650,520 A | * | 7/1997 | Hao et al. | 548/453 |
| 5,871,575 A | * | 2/1999 | Ruch et al. | 106/498 |
| 6,375,734 B1 | * | 4/2002 | Babler | 106/498 |
| 6,494,947 B1 | | 12/2002 | Hauser et al. | |

FOREIGN PATENT DOCUMENTS

| | | | |
|---|---|---|---|
| EP | 690 058 A1 | * | 6/1995 |
| JP | 58-210084 | * | 12/1983 |
| JP | 5-222314 | * | 8/1993 |
| JP | 8-48908 | * | 2/1996 |
| JP | 2005-2249 | * | 1/2005 |
| WO | WO 00/56819 A1 | | 9/2000 |
| WO | WO 01/04215 A2 | | 1/2001 |
| WO | WO 2007/045312 A1 | | 4/2007 |

OTHER PUBLICATIONS

European Patent Application No. EP 1 884 543 A1 and its corresponding European Search Report, [Feb. 2008].
Smith, Hugh M., "High Performance Pigments," WILEY-VCH, 2002, pp. 174-175 Germany, no month.*

* cited by examiner

*Primary Examiner*—Anthony J Green
(74) *Attorney, Agent, or Firm*—McDermott Will & Emery LLP (57) ABSTRACT

A process for producing dichlorodiketopyrrolopyrrole pigment of the α modification, which comprises wet milling crude dichlorodiketopyrrolopyrrole pigment wherein an α modification and a β modification coexist in the presence of a milling agent and a wetting agent, dichlorodiketopyrrolopyrrole pigment of the α modification obtained the process and a color composition which contains the pigment and a pigment carrier.

11 Claims, 1 Drawing Sheet

PROCESS FOR PRODUCING DICHLORODIKETOPYRROLOPYRROLE PIGMENT OF THE α MODIFICATION, DICHLORODIKETOPYRROLOPYRROLE PIGMENT OF THE α MODIFICATION PRODUCED BY THE PROCESS, AND COLORING COMPOSITION USING THE SAME

BACKGROUND OF THE INVENTION

1. Field of the Invention

The present invention relates to a process for producing dichlorodiketopyrrolopyrrole pigment of the α modification, dichlorodiketopyrrolopyrrole pigment of the α modification produced by the process, a coloring composition using the same, and a color filter containing the coloring composition. More particularly, it relates to a process for producing dichlorodiketopyrrolopyrrole pigment of the α modification which is size-controlled to fine particles with a uniform particle size and has extremely good dispersibility, dichlorodiketopyrrolopyrrole pigment of the α modification which is produced by this process, which has the aforementioned properties, which can impart excellent viscosity properties to a coloring composition and which, when used for a color filter to be used in a color liquid crystal device and in a solid photographing element, can form a uniform colored film having a higher contrast ratio, thus providing a color filter having excellent display quality, i.e., high lightness, high distinctness and high transmittance, a coloring composition containing the pigment, and a color filter containing the coloring composition.

2. Description of Related Art

Dianthraquinone pigments, perylene pigments, diketopyrrolopyrrole pigments, and the like have conventionally been used for producing a red filter segment of a color filter. In particular, diketopyrrolopyrrole pigments are predominantly used as red pigments for a color filter owing to their high lightness, excellent light fastness and excellent heat resistance. As use of liquid crystal display devices has been enlarged from monitors to large-sized color television sets in recent years, color filters have become required to have a high contrast ratio. As a result, pigments are required to be finer and more size-controlled particles than those of pigments which are commonly used in printing inks, gravure inks and coloring agents. In order to meet the requirement, it is necessary to more reduce and more control the primary particle size of the pigments.

With some organic pigments such as azo pigments, it is possible to obtain fine and size-controlled particles by properly selecting reaction conditions upon synthesis thereof. However, there are those pigments such as copper phthalocyanine green pigment which are generated upon synthesis as extremely fine and agglomerated particles and are then subjected to an after-treatment to cause growth of particles and to control size of the particles, and those pigments such as copper phthalocyanine blue pigment which are generated upon synthesis as coarse and irregular particles and are then subjected to an after-treatment to reduce and control the particle size, thereby forming a pigment product. The diketopyrrolopyrrole pigments are generally synthesized by the reaction of a succinic acid diester with an aromatic nitrile in an organic solvent (see JP-A-58-210084). The crude diketopyrrolopyrrole pigment is heat-treated in water or in an organic solvent, and then subjected to pulverization such as wet milling to convert into a form adequate for use (see JP-A-5-222314).

Of the diketopyrrolopyrrole pigments, C.I. Pigment Red 254, a dichlorodiketopyrrolopyrrole pigment, is the pigment predominantly used for a color filter. As C.I. Pigment Red 254, α and β modification are known (see JP-A-8-48908). In JP-A-8-48908, the β modification is defined as a novel crystal modification of the dichlorodiketopyrrolopyrrole pigment while a crystal modification known before filing of the patent application is described as the α modification. It is also described therein that the β modification is obtained by synthesis of dichlorodiketopyrrolopyrrole. X-Ray diffraction charts of the α modification and the β modification are also known (see High Performance Pigments, WILEY-VCH, pp. 174-175) and, in general, it is known that the α modification is a stable system, whereas the β modification is an unstable system. The crystal modification of dichlorodiketopyrrolopyrrole pigment conventionally used for a color filter is the α modification.

However, since the dichlorodiketopyrrolopyrrole pigment of the α modification is produced through a step of heat-treating in water or in an organic solvent, the pigment particles have a large particle size. Therefore, dichlorodiketopyrrolopyrrole pigment of the α modification comprising fine and size-controlled particles have been unable to be obtained even by wet milling the dichlorodiketopyrrolopyrrole pigment of the α modification.

Further, in the case of wet milling the dichlorodiketopyrrolopyrrole pigment of the β modification, it is necessary to convert the crystal modification from the β modification to the α modification by wet milling. Therefore, in order to obtain fine dichlorodiketopyrrolopyrrole pigment of the α modification from dichlorodiketopyrrolopyrrole pigment of the β modification, both a period of crystal transfer step and a period of pulverizing step are required. Further, since crystal transfer is involved, the pigment particle size immediately after the conversion is larger than before performing the wet milling, thus efficiency being extremely bad.

SUMMARY OF THE INVENTION

An object of the present invention is to provide a process for producing with high efficiency dichlorodiketopyrrolopyrrole pigment of the α modification which is size-controlled to fine particles, by using crude dichlorodiketopyrrolopyrrole pigment wherein the α modification and the β modification coexist and transferring the crystal transformation to the α modification in the step of controlling particle size to a uniform and fine size without performing crystal transformation to the α modification through treatment in a solvent.

Another object of the present invention is to provide dichlorodiketopyrrolopyrrole pigment of the α modification that is size-controlled to fine particles.

A further object of the present invention is to provide a coloring composition containing dichlorodiketopyrrolopyrrole pigment of the α modification which is size-controlled to fine particles.

As a result of intensive investigations to attain the above-described objects, the inventors have found that crystal transformation to the α modification of dichlorodiketopyrrolopyrrole pigment can be performed simultaneously with making it fine by wet milling crude dichlorodiketopyrrolopyrrole pigment wherein the α modification and the β modification coexist, that dichlorodiketopyrrolopyrrole pigment of the α modification which is size-controlled to particles having a finer and more uniform particle size in comparison with the dichlorodiketopyrrolopyrrole pigment obtained by the conventional process can be produced, that the dichlorodiketopyrrolopyrrole pigment of the α modification obtained by this process has such an excellent dispersibility that a coloring composition wherein this pigment is dispersed shows excellent viscosity properties and the resulting coloring composition can form, when used as a color filter material to be used in a color liquid crystal display device or a solid photographing element, a uniformly colored film having a higher contrast ratio, and that a color filter having excellent quality, i.e., high lightness, high distinctness and high transmittance can be produced, thus having achieved the invention.

That is, the present invention relates to a process for producing dichlorodiketopyrrolopyrrole pigment of the α modification, which comprises wet milling crude dichlorodiketopyrrolopyrrole pigment wherein the α modification and the β modification coexist in the presence of a milling agent and a wetting agent.

Further, the present invention relates to the process for producing the pigment as described above, which is characterized in that, in measurement of powder X-ray diffraction using a CuKα ray, $I_\beta/(I_\alpha+I_\beta)$ is from 0.08 to 0.90 wherein $I_\alpha$ represents an intensity at a Bragg angle (2θ) of 28.1±0.3° characteristic of the α modification in the crude dichlorodiketopyrrolopyrrole pigment and $I_\beta$ represents an intensity at a Bragg angle (2θ) of 27.0±0.3° characteristic of the β modification in the crude dichlorodiketopyrrolopyrrole pigment.

Still further, the present invention relates to the process for producing the pigment as described in any of the above paragraphs, wherein the crude dichlorodiketopyrrolopyrrole pigment is a product obtained by reacting a succinic acid diester with an aromatic nitrile in an organic solvent.

Still further, the present invention relates to the process for producing the pigment as described in any of the above paragraphs, wherein wet pulverizing is performed at a temperature of 20° C. to 150° C.

Still further, the present invention relates to the process for producing the pigment as described in any of the above paragraphs, wherein the amount of the milling agent is from 0.5 to 50 times by weight of the crude dichlorodiketopyrrolopyrrole pigment.

Still further, the present invention relates to the process for producing the pigment as described in any of the above paragraphs, wherein the amount of the wetting agent is from 0.1 to 10 times by weight of the crude dichlorodiketopyrrolopyrrole pigment.

Still further, the present invention relates to the process for producing the pigment as described in any of the above paragraphs, wherein wet milling is performed in the presence of a dye derivative.

Still further, the present invention relates to the process for producing the pigment as described in the above paragraph, wherein the dye derivative to be used in wet milling is at least one dye derivative selected from among diketopyrrolopyrrole dye derivatives, quinacridone dye derivatives and azo dye derivatives.

Still further, the present invention relates to dichlorodiketopyrrolopyrrole pigment of the α modification produced by the process for producing pigment as described in any of the above paragraphs.

Still further, the present invention relates to dichlorodiketopyrrolopyrrole pigment of the α modification described above, which is characterized in having a BET specific surface area of from 80 m²/g to 150 m²/g.

Yet further, the present invention relates to a coloring composition, which contains the pigment described in any of the above paragraphs and a pigment carrier.

ADVANTAGEOUS EFFECT OF THE INVENTION

According to the present invention, transfer from the β modification to the α modification proceeds upon wet milling and, at the same time, milling proceeds by kneading with the milling agent. Thus, in comparison with the conventional process wherein transfer to the α modification is conducted by treatment in a solvent and then the product obtained is milled, dichlorodiketopyrrolopyrrole pigment of the α modification can be obtained more efficiently with less production cost in the invention. In addition, more finely pulverized dichlorodiketopyrrolopyrrole pigment of the α modification can be obtained by the process of the invention. Further, since particle growth occurs in the course of the transfer from the β modification to the α modification, in the case where an agglomerate of the crude dichlorodiketopyrrolopyrrole pigment contains the pigment of the α modification, deflocculation of the agglomerate of the pigment is accelerated by the particle growth, thus highly size-controlled dichlorodiketopyrrolopyrrole pigment of the α modification being obtained. Furthermore, addition of the dye derivative serves to enhance the kneading efficiency upon milling. This permits to obtain more finely pulverized and more highly size-controlled dichlorodiketopyrrolopyrrole pigment of the α modification and impart heat resistance and solvent resistance to the pigment.

Also, the dichlorodiketopyrrolopyrrole pigment obtained by the present invention has the α modification, and is so fine and so highly size-controlled that its dispersion in a pigment carrier has low viscosity properties adequate for coating and provides a coating film having high lightness, high distinctness and high transmittance.

Further, the dichlorodiketopyrrolopyrrole pigment obtained by the present invention has absorption wavelength characteristics favorable for the use of color filter to be used in a color liquid crystal display device or a solid photographing element and comprises fine and size-controlled pigment particles, and hence, it can provide a colored film having a high contrast ratio which is important as a characteristic property of a color filter.

DETAILED DESCRIPTION OF THE INVENTION

In the process of the present invention for producing dichlorodiketopyrrolopyrrole pigment of the α modification, crude dichlorodiketopyrrolopyrrole pigment wherein the α modification and the β modification coexist is used as a crude pigment to be subjected to wet milling. The crude dichlorodiketopyrrolopyrrole pigment wherein the α modification and the β modification coexist which is to be subjected to wet milling in the present invention may be one which is obtained by mixing independently prepared crude dichlorodiketopyrrolopyrrole pigment of the α modification and crude dichlorodiketopyrrolopyrrole pigment of the β modification, or one which is produced as a product wherein crude dichlorodiketopyrrolopyrrole pigment of the α modification and crude dichlorodiketopyrrolopyrrole pigment of the β modification coexist upon production thereof.

Control of crystal modification of dichlorodiketopyrrolopyrrole is mainly performed through conditions upon protonation of an alkali metal salt of crude dichlorodiketopyrrolopyrrole pigment obtained by reaction of a succinic acid diester and 4-chlorobenzonitrile in a conventionally known manner. To be described by referring to a specific example, crude dichlorodiketopyrrolopyrrole pigment of the α modification can be obtained by, for example, conducting protonation of an alkali metal salt of crude dichlorodiketopyrrolopyrrole pigment in methanol and glacial acetic acid according to the process described in Example 6 of JP-A-58-210084. Also, crude dichlorodiketopyrrolopyrrole pigment of the β modification can be obtained by, for example, conducting protonation of an alkali metal salt of crude dichlorodiketopyrrolopyrrole pigment in a mixed solvent of methanol, water and concentrated sulfuric acid at 0° C. according to the process described in Example 2 of JP-A-8-48908. In the present invention, as crude dichlorodiketopyrrolopyrrole pigment wherein the α modification and the β modification coexist and which is to be subjected to wet milling, a mixture of such crude dichlorodiketopyrrolopyrrole pigment of the α modification and such crude dichlorodiketopyrrolopyrrole pigment of the β modification.

Also, the crude dichlorodiketopyrrolopyrrole pigment wherein the α modification and the β modification coexist and which is to be subjected to wet milling according to the invention can be obtained by, for example, conducting protonation of an alkali metal salt of crude dichlorodiketopyrrolopyrrole pigment, obtained by reacting a succinic acid diester with 4-chlorobenzonitrile in an organic solvent in a conventionally known manner, in a mixed solvent of methanol, water and acetic acid at 0 to 20° C.

Presence or absence of the α modification and the β modification in the crude dichlorodiketopyrrolopyrrole pigment can be confirmed by measurement of powder X-ray diffraction using a CuKα ray. That is, an Bragg angle (2θ) characteristic of the β modification of dichlorodiketopyrrolopyrrole is 27.0±0.3° and, with the α modification, almost no peak is observed at this Bragg angle (2θ). Also, an Bragg angle (2θ) characteristic of the α modification of dichlorodiketopyrrolopyrrole is 28.1±0.3° and, with the β modification, almost no peak is observed at this Bragg angle (2θ). Thus, presence or absence of dichlorodiketopyrrolopyrrole pigment of the α modification and dichlorodiketopyrrolopyrrole pigment of the β modification can be easily determined by checking presence or absence of the Bragg angles corresponding to the α modification and the β modification in the diffraction profile of the crude pigment.

In order to obtain fine and size-controlled dichlorodiketopyrrolopyrrole pigment of the α modification with high efficiency, it is necessary to use crude dichlorodiketopyrrolopyrrole pigment wherein the α modification and the β modification coexist and not to use crude dichlorodiketopyrrolopyrrole pigment of the α modification or crude dichlorodiketopyrrolopyrrole pigment of the β modification independently. In the case of using only crude dichlorodiketopyrrolopyrrole pigment of the α modification for the wet milling, crude dichlorodiketopyrrolopyrrole pigment of the β modification generated immediately after protonation must be transferred to the α modification by the crystal transfer. In order to realize this crystal transfer, it is necessary to set the temperature for protonation of the alkali metal salt of crude dichlorodiketopyrrolopyrrole pigment at a higher level than in synthesizing crude dichlorodiketopyrrolopyrrole pigment wherein the α modification and the β modification coexist. In case where the protonation temperature is at a higher level, the degree of particle growth of resulting crude dichlorodiketopyrrolopyrrole pigment would become larger even when a succinic acid diester and 4-chlorobenzonitrile are reacted with each other under the same conditions except temperature. As a result, the crude dichlorodiketopyrrolopyrrole pigment of the α modification has a larger pigment particle size than crude dichlorodiketopyrrolopyrrole pigment wherein the α modification and the β modification coexist. It is also necessary to convert the crude dichlorodiketopyrrolopyrrole pigment of the β modification generated immediately after protonation to the crude dichlorodiketopyrrolopyrrole pigment of the α modification by subsequent stirring, upon which particle growth occurs as well. Since the crude dichlorodiketopyrrolopyrrole pigment of the α modification has undergone more progressed crystal transfer than crude dichlorodiketopyrrolopyrrole pigment wherein the α modification and the β modification coexist, the particle size thereof becomes larger by the particle growth. In order to produce fine dichlorodiketopyrrolopyrrole pigment of the α modification, it is effective to wet milling finer crude dichlorodiketopyrrolopyrrole pigment. Therefore, use of crude dichlorodiketopyrrolopyrrole pigment wherein the α modification and the β modification coexist and which has a smaller particle size serves to produce fine dichlorodiketopyrrolopyrrole pigment of the α modification with good efficiency.

On the other hand, in the case of using only crude dichlorodiketopyrrolopyrrole of the β modification for the wet milling, it is necessary to transfer the crystal modification to the α modification by wet milling and, thus, the wet milling procedure requires both a period for crystal transfer and a period for making the pigment fine. In addition, since these processes involve the crystal transfer, the particle size of the pigment immediately after the crystal transfer becomes larger than before wet milling, leading to extremely poor efficiency. Further, in the case of adding a dye derivative upon wet milling for the purpose of imparting heat resistance and solvent resistance to the pigment, an extremely long period is required for the crystal transfer comparison with the case of not adding the dye derivative, leading to poor efficiency.

Upon wet milling crude dichlorodiketopyrrolopyrrole pigment wherein the α modification and the β modification coexist, crystal transfer from the β modification to the α modification thereof advances and, at the same time, milling proceeds due to kneading together with a milling agent, thus finely pulverized dichlorodiketopyrrolopyrrole pigment of the α modification being obtained. Further, since growth of the particles occurs during crystal transfer from the α modification to the α modification, defloculation of an agglomerate of the pigment is accelerated by the particle growth in the case where the diketopyrrolopyrrole pigment of the β modification is contained in the agglomerate of the crude diketopyrrolopyrrole pigment, thus highly size-controlled dichlorodiketopyrrolopyrrole pigment of the α modification being obtained.

The ratio of the β modification in the crude dichlorodiketopyrrolopyrrole pigment to be used in the present invention can be represented in terms of $I_\beta/(I_\alpha+I_\beta)$ wherein $I_\alpha$ represents an intensity at a Bragg angle (2θ) of 28.1±0.3°, obtained by measurement of powder X-ray diffraction using a CuKα ray, characteristic of the α modification in the crude dichlorodiketopyrrolopyrrole pigment and $I_\beta$ represents an intensity at a Bragg angle (2θ) of 27.0±0.3° characteristic of the β modification in the crude dichlorodiketopyrrolopyrrole pigment. In the present invention, measurement of powder X-ray diffraction can be performed according to JIS K0131 (general rules on X-ray diffractometry) using a powder X-ray diffraction-measuring apparatus RINT2100 (manufactured by Rigaku Corporation). A method of calculating a value of $I_\beta/(I_\alpha+I_\beta)$ wherein $I_\alpha$ represents an intensity at a Bragg angle (2θ) of 28.1±0.3° characteristic of the α modification in the crude dichlorodiketopyrrolopyrrole pigment and $I_\beta$ represents an intensity at a Bragg angle (2θ) of 27.0±0.3° characteristic of the β modification in the crude dichlorodiketopyrrolopyrrole pigment will be more specifically described below using FIGS. 1 and 2.

Figure 1:
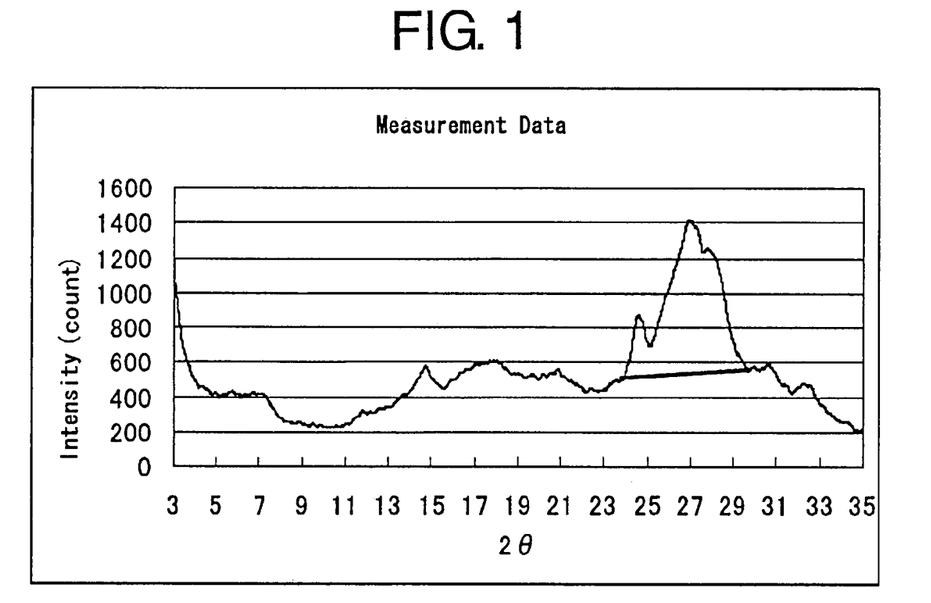
FIG. 1 shows one example of a powder X-ray diffraction profile of crude dichlorodiketopyrrolopyrrole pigment.
Figure 2:
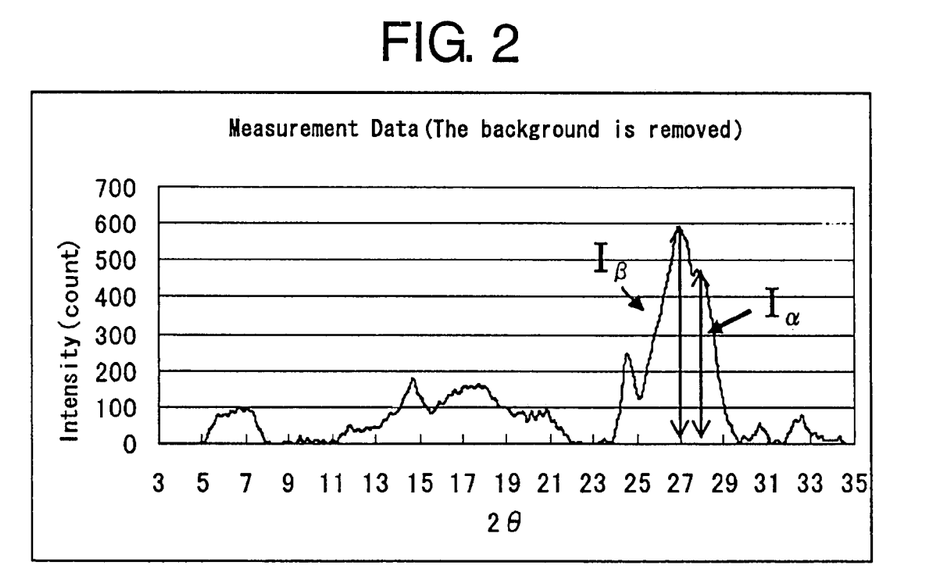
FIG. 2 shows a diffraction profile obtained by removing background from the diffraction profile shown by FIG. 1.

FIG. 1 shows one example of the diffraction profile obtained by powder X-ray diffraction of crude dichlorodiketopyrrolopyrrole pigment. FIG. 2 shows a diffraction profile obtained by removing background in the diffraction profile shown in FIG. 1. In FIGS. 1 and 2, the Bragg angle (2θ) is on the X-axis, and the intensity (counts) of diffraction peak is on the Y-axis. Removal of the background from the diffraction profile in FIG. 1 is performed in the conventional manner with particular care being paid for the background in the range of from about 23° to about 30° to be used for calculating the intensity ratio. With the background in the range of from about 23° to about 30°, a tangential line is drawn which comes in contact with about 24° which is the foot of the side of the lower angle of 24.5, a Bragg angle (2θ) for the α modification, and about 29.0° which is the foot of the side of the higher angle of 28.0, a Bragg angle (2θ) for the α modification, and values on this line are subtracted as the background. For example, in FIG. 2 an intensity $I_\alpha$ at 28.1° which is a Bragg angle (2θ) characteristic of the α modification is 490, whereas an intensity $I_\beta$ at 27.0° which is a Bragg angle (2θ) characteristic of the β form crystal transformation is 600. In this case, the value of $I_\beta/(I_\alpha+I_\beta)$ is 0.55.

In the present invention, crude dichlorodiketopyrrolopyrrole pigment to be used as a starting material in producing dichlorodiketopyrrolopyrrole pigment of the α modification has a value of $I_\beta/(I_\alpha+I_\beta)$ of preferably from 0.08 to 0.90, more preferably from 0.1 to 0.85, wherein $I_\alpha$ represents an intensity at a Bragg angle (2θ) of 28.1±0.3°, obtained by the aforementioned measurement of powder X-ray diffraction using a CuKα ray, characteristic of the α modification in the crude dichlorodiketopyrrolopyrrole pigment and $I_\beta$ represents an intensity at a Bragg angle (2θ) of 27.0±0.3° characteristic of the β modification in the crude dichlorodiketopyrrolopyrrole pigment.

The wet milling employed in the present invention is a process wherein crude dichlorodiketopyrrolopyrrole pigment is pulverized as a viscous liquid composition together with a milling agent such as a water-soluble inorganic salt and a wetting agent such as an organic solvent.

Examples of the water-soluble inorganic salt to be used in the present invention as a milling agent include sodium chloride, potassium chloride, calcium chloride, barium chloride and sodium sulfate. Regarding the amount of the water-soluble inorganic salt, a more amount of the salt provides a more enhanced milling effect. Usually, however, the amount of the salt is preferably 0.5 to 50 times by weight of the crude dichlorodiketopyrrolopyrrole pigment and, more preferably 1 to 20 times by weight of the pigment in view of productivity and production cost. Further, the water content of the water-soluble inorganic salt is preferably 1% or less. The milling agent as a milling media has preferably a pulverization particle size of from 5 to 50 μm, a sharp particle size distribution and a spherical shape.

The wetting agent to be used in the present invention is not particularly limited as long as it can swell the aforesaid crude dichlorodiketopyrrolopyrrole pigment when in contact with the pigment to enhance the milling effect and accelerate fine pulverization of the pigment, but water-soluble organic solvents are illustrated as preferred examples. As the water-soluble organic solvents, there can be illustrated methanol, ethanol, isopropanol, n-propanol, isobutanol, n-butanol, ethylene glycol, diethylene glycol, diethylene glycol monomethyl ether, diethylene glycol monoethyl ether, diethylene glycol monobutyl ether, propylene glycol, propylene glycol monomethyl ether acetate, acetone, dimethylformamide, dimethylsulfoxide, N-methylpyrrolidone, etc. These may be used, if necessary, as a mixture of two or more thereof. The amount of the water-soluble organic solvent to be used is preferably from 0.1 to 10 times by weight, more preferably from 1 to 4 times by weight of crude dichlorodiketopyrrolopyrrole pigment.

In the wet milling, a small amount of an organic solvent such as benzene, toluene, xylene, ethylbenzene, chlorobenzene, nitrobenzene, aniline, pyridine, quinoline, tetrahydrofuran, dioxane, ethyl acetate, isopropyl acetate, butyl acetate, hexane, heptane, octane, nonane, decane, undecane, dodecane, cyclohexane, methylcyclohexane, halogenated hydrocarbon, methyl ethyl ketone, methyl isobutyl ketone, cyclohexanone or the like may be used in combination with the above-mentioned water-soluble organic solvent as long as the whole amount of the organic solvent is adsorbed by the pigment and is not discharged into the waste liquor. These organic solvents may be used in combination of two or more thereof as needed.

The wet milling apparatus to be used in the production process of the present invention for wet milling crude dichlorodiketopyrrolopyrrole pigment is not particularly limited, and there may be used such apparatuses as Trimix (manufactured by Inoue MFG.), Super-mix (manufactured by Shinei Kikai Co., Ltd.) or a kneader having high milling effect (manufactured by Inoue MFG.). Also, there exist no limitations in the present invention as to operating conditions of the wet milling apparatus, and the apparatus may be operated at an inside temperature of from 20 to 150° C. For example, in the case where the apparatus is a kneader, the rotation number of the blade within the apparatus is preferably from 10 to 200 rpm, but a relatively larger rotation ratio of two axes provides a larger milling effect, thus being preferred. The operating period is preferably from 1 to 24 hours in view of productivity and production cost and the inside temperature of the apparatus is preferably from 20 to 80° C. in order to obtain fine and size-controlled particles.

In the present invention, in order to accelerate kneading effect in the wet milling, a dye derivative may be used. Use of the dye derivative is extremely effective for more reducing the particle size of dichlorodiketopyrrolopyrrole pigment and more size-controlling the pigment.

The dye derivative is a compound formed by introducing into a dye a hydroxyl group, a carboxyl group, a sulfone group, a carbamoyl group, a sulfonamido group, a phthalimidomethyl group or a basic substituent represented by the following general formula (1) or (2):

General formula (1)

Wherein X represents a single bond, —CH$_2$NHCOCH$_2$—, —SO$_2$NH—, —CONHOCH$_2$NH— or —(CH$_2$)$_q$NH—, $R_1$ and $R_2$ each independently represents a saturated or unsaturated alkyl group which may be substituted, or $R_1$ and $R_2$ are connected to each other to form heterocyclic ring which may further contain a nitrogen, oxygen or sulfur atom, which may be substituted, provided that n and q each is an integer of from 1 to 10;

General formula (2)

wherein Z represents a single bond, —SO$_2$—, —CO—, —CH$_2$NHCOCH$_2$—, —(CH$_2$)$_q$—, —SO$_2$NH—, —CONH—, —CH$_2$NHCOCH$_2$NH— or (CH$_2$)$_q$NH—, provided that q is an integer of from 1 to 10. $R_3$, $R_4$, $R_5$ and $R_6$ each independently represents a hydrogen atom, a saturated or unsaturated alkyl group or an aryl group, which may be substituted, and $R_7$ represents a saturated or unsaturated alkyl group or an aryl group, which may be substituted.

As the dye derivatives, diketopyrrolopyrrole derivatives, quinacridone derivatives and azo dye derivatives are preferred in view of not staining color hue of the dichlorodiketopyrrolopyrrole pigments.

As the diketopyrrolopyrrole derivatives, there may be used the following compounds which, however, are not limitative at all.

-continued

Also, as the quinacridone derivatives, there may be used the following compounds which, however, are not limitative at all.

Further, as the azo dye derivatives, there are illustrated compounds represented by the following general formula (3):

General formula (3)

wherein A and B each independently represents a hydroxyl group or a basic substituent represented by the following general formula (4) or (5):

General formula (4)

General formula (5)

wherein $R_1$ and $R_2$ each independently represents a saturated or unsaturated alkyl group, which may be substituted, or $R_1$ and $R_2$ are connected to each other to form a heterocyclic ring which may further contain a nitrogen, oxygen or sulfur atom, which may be substituted, provided that n is an integer of from 1 to 10.

As the azo dye derivatives, there may be used the following compounds which, however, are not limitative at all.

-continued

In the present invention, resins, surfactants or higher fatty acids may be added, as needed, besides the dye derivatives in order to improve dispersibility of the pigments upon wet pulverizing.

Resins which can be used are not particularly limited. Examples of the resin include rosin, rosin derivatives, rosin-modified maleic acid resin, rosin-modified phenol resin, rubber derivatives, protein derivatives, chlorinated polyethylene, chlorinated polypropylene, polyvinyl chloride, polyvinyl acetate, epoxy resin, acrylic resin, maleic acid resin, styrene resin, styrene-maleic acid copolymer resin, butyral resin, polyester resin, melamine resin, phenol resin, polyurethane resin, polyamide resin, polyimide resin, alkyd resin, rubber-based resins, celluloses, benzoguanamine resin and urea resin. The amount of the resin to be used is not particularly limited but is preferably from 0.01 to 0.1 times by weight of crude dichlorodiketopyrrolopyrrole pigment. Also, the surfactants are not particularly limited, and any of anionic, nonionic and cationic surfactants may be used. The amount of the surfactant to be used is not particularly limited but is preferably from 0.01 to 0.1 times by weight of crude dichlorodiketopyrrolopyrrole pigment.

Fatty acids include higher fatty acids and lower fatty acids. The higher fatty acids are acids containing a large number of carbon atoms, react with glycerin to form fats or oils and are components that compose animal fats and plant oils. As typical examples thereof, there are illustrated acids that are strongly lipophilic and scarcely soluble in water such as palmitic acid, linoleic acid, stearic acid, linolenic acid and oleic acid. In the present invention, fatty acids containing 10 or more carbon atoms are preferred as the higher fatty acids, with unsaturated higher fatty acids that are liquid at 20° C. to 30° C. being more preferred. On the other hand, as fatty acids containing a small number of carbon atoms, there are illustrated, as typical examples, acetic acid, valeric acid and butyric acid. The lower fatty acids are in the form of free acids and are hydrophilic. As fatty acids that can wet pigments to enhance milling effect and accelerate reduction in particle size, higher fatty acids having a strong lipophilicity are adequate. Water-soluble inorganic salts and water-soluble organic solvents to be used in the wet milling procedure can be separated from pulverized fine pigments by washing with water. When hydrophilic fatty acids containing a small number of carbon atoms are used, the hydrophilic fatty acids also dissolved in water and can cause an increase in BOD and COD, thus use thereof being not preferred. The higher fatty acids may be used as a mixture of two or more thereof, as needed. The amount of higher fatty acid to be used is not particularly limited, but is preferably from 0.01 to 0.1 times by weight of crude dichlorodiketopyrrolopyrrole pigment.

The process for producing dichlorodiketopyrrolopyrrole pigment of the present invention having the α modification is usually conducted in the following manner which, however, are not to be construed as limiting the production process of the present invention in any way.

That is, first, a mass of dry crude pigment obtained in a conventionally known manner by, for example, reacting a succinic acid diester with aromatic nitrile in an organic solvent is loosened to powder in a known manner. The resulting crude pigment, a milling agent, a wetting agent and, as needed, a dye derivative, a resin, a surfactant, a higher fatty acid, etc. are placed in a milling machine, followed by performing wet milling, for example, at 20 to 150° C. for 1 to 24 hours. After completion of wet milling, the pigment is washed with water to remove the milling agent and the wetting agent and then is filtered. The thus-obtained wet cake is dried and grinded. Additionally, the order of placing the respective materials in the milling machine may be arbitrary. The production process of the present invention can provide fine dichlorodiketopyrrolopyrrole pigment of the α modification having a uniform particle size and a BET specific surface area of 80 m$^2$/g or more.

Dichlorodiketopyrrolopyrrole pigment of the α modification produced by the production process of the present invention has a BET specific surface area of preferably 80 m$^2$/g or more and 150 m$^2$/g or less. In the case of using dichlorodiketopyrrolopyrrole pigment of the present invention having the α modification as pigment for a color filter, pigments with a larger BET specific surface area are preferred in view of improving contrast ratio which is a characteristic property of a color filter, thus the BET surface area being preferably 100 m$^2$/g or more and 150 m$^2$/g or less, more preferably 130 m$^2$/g or more and 150 m$^2$/g or less, for example. With the dichlorodiketopyrrolopyrrole pigment, agglomeration strongly occurs as the particle size of the pigment is reduced. In some cases, the value of BET specific surface area thereof does not increase in spite of reduction in particle size, thus not showing a true value of BET specific surface area. As a method for preparing a pigment sample before measuring specific surface area, it is preferred to freeze an aqueous paste of pigment after formation of the pigment at −15° C. overnight and then dry in a 25° C. reduced-pressure drier.

In the present invention, it can be judged from the standard deviation of the particle size distribution of measured primary particle sizes of the pigment whether size controlling of pigment particles is proceeding or not. For example, in comparing the case where the standard deviation of primary particle sizes is 10 with the case where the standard deviation of primary particle sizes is 20, the former case where the standard deviation is 10 can be judged to have a narrower width of particle size distribution and have undergone more progressed size controlling. Like the particle size of pigment, the size-controlled degree of the pigment exerts a great influence on the contrast ratio which is a characteristic property of color filter, and difference in standard deviation by 1 leads to a great influence on the contrast ratio. In the present invention, the standard deviation of primary particles necessary for judging the size-controlled degree can be confirmed by observing the obtained pigment under an electron microscope (for example, "Electron Microscope H-7650" manufactured by Hitachi High Technology) and conducting analysis on particle size distribution of the primary particles using an image-analyzing software (manufactured by, for example, Soft Imaging System Co.) to calculate the standard deviation of primary particle sizes.

The dichlorodiketopyrrolopyrrole pigment of the present invention having the α modification can be used as a powder, paste, flush paste or formulation. The dichlorodiketopyrrolopyrrole pigment of the present invention having the α modification can be formulated into a coloring composition such as an ink for offset printing, an ink for gravure printing, an ink for water-free offset printing, an ink for silk screen printing or a solvent-developing type or alkali-developing type coloring resist material by dispersing it in a pigment carrier. Of course, it can also be used in any other use than the above-mentioned uses, such as a colorant for resins to be molded, paint or sizing color. Since the dichlorodiketopyrrolopyrrole pigment of the present invention having the α modification is finely pulverized and size-controlled so that a scatter in particle size of the primary particles thereof is small, it can be dispersed uniformly in a pigment carrier with maintaining the fine particle state. A coloring composition thus dispersed shows a stable viscosity property, and use of the coloring composition provides a high lightness, distinctness and transmittance. Thus, the dichlorodiketopyrrolopyrrole pigment of the present invention having the α modification can be used particularly preferably for producing a color filter.

The pigment carrier is usually constituted by a resin, its precursor or a mixture thereof. The resin includes thermosetting resins, thermoplastic resins and active energy ray-curable resins, and the precursor of the resin includes monomers, oligomers, etc. which are cured by irradiation with active energy rays to form the same coating film as the film formed by the resin. These may be used independently or as a mixture of two or more thereof. The pigment carrier is used in an amount of preferably from 50 to 700 parts by weight, more preferably from 100 to 400 parts by weight, per 100 parts by weight of the fine dichlorodiketopyrrolopyrrole pigment of the a form crystal transformation.

In the case of producing a color filter by using the coloring composition, the resin is preferably a transparent resin having a transmittance of 80% or more, preferably 95% or more, in the every wavelength region of from 400 to 700 nm in visible light region. In addition, since heating processing at a high temperature is to be conducted in the post-step in producing color filters, it is necessary to use a resin having good heat resistance.

Examples of the thermoplastic resin include a butyral resin, styrene-maleic acid copolymer, chlorinated polyethylene, chlorinated polystyrene, polyvinyl chloride, vinyl chloride-vinyl acetate copolymer, polyvinyl acetate, polyurethane resin, polyester resin, acrylic resin, alkyd resin, polystyrene resin, polyamide resin, rubber-based resin, cyclized rubber-based resin, celluloses, polyethylene (HDPE, LDPE), polybutadiene, polyimide resin, etc. Examples of the thermosetting resin include an epoxy resin, benzoguanamine resin, rosin-modified maleic acid resin, rosin-modified fumaric acid resin, melamine resin, urea resin, phenol resin, etc.

As the active energy ray-curable resin, those resins can be used which are formed by introducing, via an isocyanato group, an aldehydro group or an epoxy group, a photo-crosslinkable group such as a (meth)acrylic compound or cinnamic acid into a polymer having a reactive substituent such as a hydroxyl group, a carboxyl group or an amino group. Also, polymers obtained by half-esterifying a linear polymer containing acid anhydride, such as a styrene-maleic anhydride copolymer or an α-olefin-maleic anhydride copolymer, with a (meth)acrylic compound having a hydroxyl group such as hydroxyalkyl (meth)acrylate can be used.

As the precursor monomer and oligomer of the resin, there are illustrated, for example, various acrylic acid esters and methacrylic acid esters such as 2-hydroxyethyl (meth)acrylate, 2-hydroxypropyl (meth)acrylate, cyclohexyl (meth)acrylate, polyethylene glycol di(meth)acrylate, pentaerythritol tri(meth)acrylate, dipentaerythritol hexa(meth)acrylate, tricyclodecanyl (meth)acrylate and caprolactone adduct of dipentaerythritol hexa(meth)acrylate; acrylic acid; methacrylic acid; (meth)acrylamide; N-hydroxymethyl(meth) acrylamide; styrene; vinyl acetate; acrylonitrile; melamine (meth)acrylate; and epoxy (meth)acrylate prepolymer.

When the coloring composition is curable by irradiation with UV rays, a photo polymerization initiator is added to the composition. As the photo polymerization initiator, any of conventionally used photo polymerization initiators may be used. To specifically illustrate the photo polymerization initiator, there are illustrated, for example, acetophenone based photo polymerization initiators such as 4-phenoxydichloroacetophenone, 4-t-butyl-dichloroacetophenone, diethoxyacetophenone, 1-(4-isopropylphenyl)-2-hydroxy-2-methylpropan-1-one, 1-hydroxycyclohexyl phenyl ketone, 2-benzyl-2-dimethylamino-1-(4-morpholinophenyl)-butan-1-one, 2-methyl-1-[4-(methylthio)phenyl]-2-morpholino-propan-1-one; benzoin based photo polymerization initiators such as benzoin, benzoin methyl ether, benzoin ethyl ether, benzoin isopropyl ether and benzyldimethylketal; benzophenone based photo polymerization initiators such as benzophenone, benzoylbenzoic acid, methyl benzoylbenzoate, 4-phenylbenzophenone, hydroxybenzophenone, acrylated benzophenone and 4-benzoyl-4'-methyldiphenylsulfide; thioxanthone based photo polymerization initiators such as thioxanthone, 2-chlorothioxanthone, 2-methylthioxanthone, isopropylthioxanthone and 2,4-diisopropylthioxanthone; triazine based photo polymerization initiators such as 2,4,6-trichloro-s-triazine, 2-phenyl-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-piperonyl-4,6-bis(trichloromethyl)-s-triazine, 2,4-bis(trichloromethyl)-6-styryl-s-triazine, 2-(naphth-1-yl)-4,6-bis(trichloromethyl)-s-triazine, 2-(4-methoxy-naphth-1-yl)-4,6-bis(trichloromethyl)-s-triazine, 2,4-trichloromethyl-(piperonyl)-6-triazine and 2,4-trichloromethyl(4'-methoxystyryl)-6-triazine; borate based photo polymerization initiators; carbazole based photo polymerization initiators; and imidazole based photo polymerization initiators. The photo polymerizable initiator is used in an amount of preferably from 5 to 150 parts by weight per 100 parts by weight of the fine dichlorodiketopyrrolopyrrole pigment.

The above-mentioned photo polymerization initiators may be used independently or as a mixture of two or more thereof. It is also possible to use them in combination with sensitizers of compounds such as an α-acyloxy ester, acylphosphine oxide, methylphenyl glyoxylate, benzyl, 9,10-phenanethrenequinone, camphorquinone, ethylanthraquinone, 4,4'-diethylisophthalo-phenone, 3,3',4,4'-tetra(t-butylperoxycarbonyl)benzophenone, 4,4'-diethylaminobenzophenone, etc. The sensitizers are used in an amount of preferably from 0.1 to 150 parts by weight per 100 parts by weight of the photo polymerization initiator.

In the coloring composition may be used a solvent in order to sufficiently disperse the pigment in the pigment carrier so as to uniformly coat it on a substrate. As the solvent, there are illustrated, for example, cyclohexanone, ethyl cellosolve acetate, butyl cellosolve acetate, 1-methoxy-2-propyl acetate, diethylene glycol dimethyl ether, ethylbenzene, ethylene glycol diethyl ether, xylene, ethyl cellosolve, methyl n-amyl ketone, propylene glycol monomethyl ether, toluene, methyl ethyl ketone, ethyl acetate, methanol, ethanol, isopropyl alcohol, butanol, isobutyl ketone, petroleum series solvents, etc. These may be used independently or as a mixture thereof. The solvents are used in an amount of preferably from 500 to 4,000 parts by weight per 100 parts by weight of the dichlorodiketopyrrolopyrrole pigment.

Various dispersing means such as a three-roll mill, two-roll mill, sand mill or kneader can be used for dispersing the dichlorodiketopyrrolopyrrole pigment of the present invention in a pigment carrier. In order to facilitate this dispersing procedure, dispersing aids such as various surfactants and dye derivatives may be added thereto. Use of the dispersing aid serves to form a coloring composition containing therein a well-dispersed pigment and preventing reagglomeration of the dispersed pigment particles. In obtaining a coloring composition such as a printing ink or a colored resist material, it is preferred to remove coarse particles having a particle size of 5 μm or more, preferably 1 μm or more, more preferably 0.5 μm or more, and contaminant dust, by means of, for example, centrifugation, a sintered filter or a membrane filter.

The present invention will be specifically described by reference to Examples and Comparative Examples. However, the present invention is not limited only to the following Examples. Additionally, in the following Examples and Comparative Examples, values of BET specific surface area of pigments are values obtained by measurement using samples prepared by freezing at −15° C. overnight an aqueous paste of pigment after formation of the pigment and then drying in a 25° C. reduced-pressure drier.

EXAMPLE 1

450 g of tert-amyl alcohol dehydrated with molecular sieve and 30 g of metallic sodium having been cut into small pieces were added to a 1-L, stainless steel-made reaction vessel equipped with a reflux tube in an atmosphere of nitrogen, followed by heating to 90° C. After 1 hour, the mixture was heated to 100° C. or above and, under reflux, stirring was continued for 10 hours with vigorously stirring molten metallic sodium. Thus, metallic sodium was dissolved to prepare an alcoholate solution.

Separately, 120 g of tert-amyl alcohol having been dehydrated with molecular sieve, 88 g of diisopropyl succinate and 100 g of p-chlorobenzonitrile were added to a 500-ml, glass-made flask and were heated to 90° C. under stirring to dissolve, thus a solution of the mixture being prepared. This heated solution of the mixture was gradually dropwise added at a constant rate over 2 hours to the above-described alcoholate solution heated to 100° C. under vigorous stirring. After completion of the dropwise addition, stirring was continued at 90° C. for 2 hours under heating to obtain a solution of a metal salt of dichlorodiketopyrrolopyrrole pigment.

600 g of methanol, 600 g of water and 117 g of acetic acid were added to a 3-L, glass-made jacketed reaction vessel and were cooled to 0° C. To this cooled mixture was added, under vigorous stirring, the formerly obtained 90° C. solution of the alkali metal salt of dichlorodiketopyrrolopyrrole pigment by portions, with cooling the reaction system using a coolant so that the temperature was kept at 10° C. or lower, thus a dark red suspension being produced. After vigorously stirring this suspension for 10 minutes, the product was collected by filtration using a Nutsche. Subsequently, 300 g of methanol and 1,000 ml of water cooled to 10° C. were sprinkled over the filtration product to wash. Then, the aqueous paste of the crude crystals was subjected to heat treatment at 80° C. for 24 hours using a reduced-pressure drier to dry till the water content thereof became less than 1% by weight. Yield was 106.6 g. Subsequently, the product was grinded in a hammer mill type grinder machine, and the grinded product was passed through a 5-mm screen to obtain crude dichlorodiketopyrrolopyrrole pigment. This crude pigment had a ratio of $I_\beta/(I_\alpha+I_\beta)$ of 0.74 wherein $I_\alpha$ represents an intensity at a Bragg angle (2θ) of 28.1±0.3° characteristic of the α modification in the crude pigment and $I_\beta$ represents an intensity at a Bragg angle (2θ) of 27.0±0.3β characteristic of the β modification in the crude pigment.

100 g of the above-described crude dichlorodiketopyrrolopyrrole pigment was added to a 3-L kneader (manufactured by Inoue MGF.) together with 1,500 g of sodium chloride having been pulverized to an average particle size of 20 μm and dried. 280 g of diethylene glycol was added thereto with controlling a heat medium at 50° C. and, after forming the preferable condition of mixture, milling was initiated. After milling for 10 hours, the content was added to 10 times by weight of water, followed by stirring. After thus dissolving sodium chloride and diethylene glycol, the mixture was filtered and purified to separate the pigment. This water-containing wet cake was heat-treated in an oven at 80° C. for 24 hours to dry till the water content thereof became less than 1% by weight, and then grinded in a hammer mill type grinder machine. The grinded product was passed through a 5-mm screen to obtain dichlorodiketopyrrolopyrrole pigment. The crystal modification of the thus-obtained dichlorodiketopyrrolopyrrole pigment was the α modification, the BET specific surface area thereof was 121 m²/g, and the standard deviation showing the degree of particle size control was 7.03.

EXAMPLE 2

600 g of methanol, 600 g of water and 117 g of acetic acid were added to a 3-L, glass-made jacketed reaction vessel, and were cooled to 0° C. To this cooled mixture was added by portions, under vigorous stirring, a 90° C. solution of alkali metal salt of dichlorodiketopyrrolopyrrole pigment having been prepared in the same manner as in Example 1 with cooling using a coolant so as to keep the temperature at 10° C. or lower. Thus, a dark red suspension was generated. After vigorously stirring this suspension for 1 hour, the product was collected by filtration using a Nutsche. Subsequently, 300 g of methanol and 1,000 ml of water cooled to 10° C. were sprinkled over the filtration product to wash. Then, the aqueous paste of the crude crystals was subjected to heat treatment at 80° C. for 24 hours using a reduced-pressure drier to dry till the water content thereof became less than 1% by weight. Yield was 108.4 g. Subsequently, the product was grinded in a hammer mill type grinder machine, and the grinded product was passed through a 5-mm screen to obtain crude dichlorodiketopyrrolopyrrole pigment. This crude pigment had a ratio of $I_\beta/(I_\alpha+I_\beta)$ of 0.42 wherein $I_\alpha$ represents an intensity at a Bragg angle (2θ) of 28.1±0.3° characteristic of the α modification in the crude pigment and $I_\beta$ represents an intensity at a Bragg angle (2θ) of 27.0±0.3° characteristic of the β modification in the crude pigment.

100 g of the above-described crude dichlorodiketopyrrolopyrrole pigment was added to a 3-L kneader (manufactured by Inoue MGF.) together with 1,500 g of sodium chloride having been pulverized to an average particle size of 20 μm and dried. 280 g of diethylene glycol was added thereto with controlling a heat medium at 50° C. and, after forming the preferable condition of mixture, milling was initiated. After milling for 10 hours, the content was added to 10 times by weight of water, followed by stirring. After dissolving sodium chloride and diethylene glycol, the mixture was filtered and purified to separate the pigment. This water-containing wet cake was heat-treated in an oven at 80° C. for 24 hours to dry till the water content thereof became less than 1% by weight, and then grinded in a hammer mill type grinder machine. The grinded product was passed through a 5-mm screen to obtain dichlorodiketopyrrolopyrrole pigment. The crystal modification of the thus-obtained dichlorodiketopyrrolopyrrole pigment was the α modification, the BET specific surface area was 118 m²/g, and the standard deviation showing the degree of particle size control was 7.05.

EXAMPLE 3

600 g of methanol, 600 g of water and 117 g of acetic acid were added to a 3-L, glass-made jacketed reaction vessel, and were cooled to 0° C. To this cooled mixture was added by portions, under vigorous stirring, a 90° C. solution of alkali metal salt of dichlorodiketopyrrolopyrrole pigment having been prepared in the same manner as in Example 1 with cooling using a coolant so as to keep the temperature at 10° C. or lower. Thus, a dark red suspension was generated. After cooling the suspension to 0° C. and vigorously stirring for 2 hour, the product was collected by filtration using a Nutsche. Subsequently, 300 g of methanol and 1,000 ml of water cooled to 10° C. were sprinkled over the filtration product to wash. Then, the aqueous paste of the crude crystals was subjected to heat treatment at 80° C. for 24 hours using a reduced-pressure drier to dry till the water content thereof became less than 1% by weight. Yield was 109.8 g. Subsequently, the product was grinded in a hammer mill type grinder machine, and the grinded product was passed through a 5-mm screen to obtain crude dichlorodiketopyrrolopyrrole pigment. This crude pigment had a ratio of $I_\beta/(I_\alpha+I_\beta)$ of 0.16 wherein $I_\alpha$ represents an intensity at a Bragg angle (2θ) of 28.1±0.3° characteristic of the α modification in the crude pigment and $I_\beta$ represents an intensity at a Bragg angle (2θ) of 27.0±0.3° characteristic of the β modification in the crude pigment.

100 g of the above-described crude dichlorodiketopyrrolopyrrole pigment was added to a 3-L kneader (manufactured by Inoue MGF.) together with 1,500 g of sodium chloride having been pulverized to an average particle size of 20 μm and dried. 280 g of diethylene glycol was added thereto with controlling a heat medium at 50° C. and, after forming the preferable condition of mixture, milling was initiated. After milling for 10 hours, the content was added to 10 times by weight of water, followed by stirring. After thus dissolving sodium chloride and diethylene glycol, the mixture was filtered and purified to separate the pigment. This water-containing wet cake was heat-treated in an oven at 80° C. for 24 hours to dry till the water content thereof became less than 1% by weight, and then grinded in a hammer mill type grinder machine. The grinded product was passed through a 5-mm screen to obtain dichlorodiketopyrrolopyrrole pigment. The crystal modification of the thus-obtained dichlorodiketopyrrolopyrrole pigment was the α modification, the BET specific surface area was 110 m²/g, and the standard deviation showing the degree of particle size control was 7.12.

EXAMPLE 4

90 g of crude dichlorodiketopyrrolopyrrole pigment having been produced in the same manner as in Example 1 was added to a 3-L kneader (manufactured by Inoue MGF.) together with 1,500 g of sodium chloride having been pulverized to an average particle size of 20 μm and dried. 10 g of the following diketopyrrolopyrrole derivative and 240 g of diethylene glycol were added thereto with controlling a heat medium at 50° C. and, after forming the preferable condition of mixture, milling was initiated. After milling for 10 hours, the content was added to 10 times by weight of water, followed by stirring. After thus dissolving sodium chloride and diethylene glycol, the mixture was filtered and purified to separate the pigment. This water-containing wet cake was heat-treated in an oven at 80° C. for 24 hours to dry till the water content thereof became less than 1% by weight, and then grinded in a hammer mill type grinder machine. The grinded product was passed through a 5-mm screen to obtain dichlorodiketopyrrolopyrrole pigment. The crystal modification of the thus-obtained dichlorodiketopyrrolopyrrole pigment was the α modification, the BET specific surface area was 142 m²/g, and the standard deviation showing the degree of particle size control was 4.09.

Diketopyrrolopyrrole derivative

EXAMPLE 5

90 g of crude dichlorodiketopyrrolopyrrole pigment having been produced in the same manner as in Example 1 was added to a 3-L kneader (manufactured by Inoue MGF.) together with 1,500 g of sodium chloride having been pulverized to an average particle size of 20 μm and dried. 10 g of the following quinacridone derivative and 250 g of diethylene glycol were added thereto with controlling a heat medium at 50° C. and, after forming the preferable condition of mixture, milling was initiated. After milling for 10 hours, the content was added to 10 times by weight of water, followed by stirring. After thus dissolving sodium chloride and diethylene glycol, the mixture was filtered and purified to separate the pigment. This water-containing wet cake was heat-treated in an oven at 80° C. for 24 hours to dry till the water content thereof became less than 1% by weight, and then grinded in a hammer mill type grinder machine. The grinded product was passed through a 5-mm screen to obtain dichlorodiketopyrrolopyrrole pigment. The crystal modification of the thus-obtained dichlorodiketopyrrolopyrrole pigment was the α modification, the BET specific surface area was 125 m²/g, and the standard deviation showing the degree of particle size control was 4.15.

Quinacridone derivative

EXAMPLE 6

90 g of crude dichlorodiketopyrrolopyrrole pigment having been produced in the same manner as in Example 1 was added to a 3-L kneader (manufactured by Inoue MGF.) together with 1,500 g of sodium chloride having been pulverized to an average particle size of 20 μm and dried. 10 g of the following azo dye derivative and 250 g of diethylene glycol were added thereto with controlling a heat medium at 50° C. and, after forming the preferable condition of mixture, milling was initiated. After milling for 10 hours, the content was added to 10 times by weight of water, followed by stirring. After thus dissolving sodium chloride and diethylene glycol, the mixture was filtered and purified to separate the pigment. This water-containing wet cake was heat-treated in an oven at 80° C. for 24 hours to dry till the water content thereof became less than 1% by weight, and then grinded in a hammer mill type grinder machine. The grinded product was passed through a 5-mm screen to obtain dichlorodiketopyrrolopyrrole pigment. The crystal modification of the thus-obtained dichlorodiketopyrrolopyrrole pigment was the α modification, the BET specific surface area was 131 $m^2/g$, and the standard deviation showing the degree of particle size control was 4.23.

and dried. 280 g of diethylene glycol was added thereto with controlling a heat medium at 50° C. and, after forming the preferable condition of mixture, milling was initiated. After milling for 10 hours, the content was added to 10 times by weight of water, followed by stirring. After thus dissolving sodium chloride and diethylene glycol, the mixture was filtered and purified to separate the pigment. This water-containing wet cake was heat-treated in an oven at 80° C. for 24 hours to dry till the water content thereof became less than 1% by weight, and then grinded in a hammer mill type grinder machine. The grinded product was passed through a 5-mm screen to obtain dichlorodiketopyrrolopyrrole pigment. The crystal modification of the thus-obtained dichlorodiketopyrrolopyrrole pigment was the α modification, the BET specific surface area was 73 $m^2/g$, and the standard deviation showing the degree of particle size control was 8.79.

COMPARATIVE EXAMPLE 2

600 g of methanol, 600 g of water and 117 g of acetic acid were added to a 3-L, glass-made jacketed reaction vessel, and were heated to 60° C. To this heated mixture was added by portions, under vigorous stirring, a 90° C. solution of alkali metal salt of dichlorodiketopyrrolopyrrole pigment having AzO dye derivative

COMPARATIVE EXAMPLE 1

440 g of methanol, 400 g of water and 128.2 g of concentrated sulfuric acid were added to a 3-L, glass-made jacketed reaction vessel, and were cooled to 0° C. To this cooled mixture was added by portions, under vigorous stirring, a 90° C. solution of alkali metal salt of dichlorodiketopyrrolopyrrole pigment having been prepared in the same manner as in Example 1 with cooling using a coolant so as to keep the temperature of the cooled mixture at 0° C. or lower. Thus, a dark red suspension was generated. After stirring the suspension for 6 hours at 0° C., the product was collected by filtration using a Nutsche. Subsequently, 300 g of methanol and 1,000 ml of water cooled to 10° C. were sprinkled over the filtration product to wash. Then, the aqueous paste of the crude crystals was subjected to heat treatment at 80° C. for 24 hours using a reduced-pressure drier to dry till the water content thereof became less than 1% by weight. Yield was 105.4 g. Subsequently, the product was grinded in a hammer mill type grinder machine, and the grinded product was passed through a 5-mm screen to obtain crude dichlorodiketopyrrolopyrrole pigment. X-ray diffractometry of this crude pigment revealed that the pigment has the β modification. An intensity of $I_α$ at 28.1±0.3° which is a Bragg angle (2θ) characteristic of the α modification was not observed.

100 g of the above-described crude dichlorodiketopyrrolopyrrole pigment was added to a 3-L kneader (manufactured by Inoue MGF.) together with 2,000 g of sodium chloride having been pulverized to an average particle size of 20 μm been prepared in the same manner as in Example 1 with heating so as to keep the temperature of the mixture at 60° C. or above. Thus, a dark red suspension was generated. After stirring the suspension for 2 hours at 60° C., the product was collected by filtration using a Nutsche. Subsequently, 300 g of methanol and 1,000 ml of water were sprinkled over the filtration product to wash. Then, the aqueous paste of the crude crystals was subjected to heat treatment at 80° C. for 24 hours using a reduced-pressure drier to dry till the water content thereof became less than 1% by weight. Yield was 109.3 g. Subsequently, the product was grinded in a hammer mill type grinder machine, and the grinded product was passed through a 5-mm screen to obtain crude dichlorodiketopyrrolopyrrole pigment. X-ray diffractometry of this crude pigment revealed that the pigment has the α modification. An intensity of $I_β$ at 27.0±0.3° which is a Bragg angle (2θ) characteristic of the β modification was not observed.

100 g of the above-described crude dichlorodiketopyrrolopyrrole pigment was added to a 3-L kneader together with 1,500 g of sodium chloride having been pulverized to an average particle size of 20 μm and dried. 280 g of diethylene glycol was added thereto with controlling a heat medium at 50° C. and, after forming good dough, milling was initiated. After milling for 10 hours, the content was added to 10 times by weight of water, followed by stirring. After thus dissolving sodium chloride and diethylene glycol, the mixture was filtered and purified to separate the pigment. This water-containing wet cake was heat-treated in an oven at 80° C. for 24 hours to dry till the water content thereof became less than 1% by weight, and then grinded in a hammer mill type grinder machine. The grinded product was passed through a 5-mm screen to obtain dichlorodiketopyrrolopyrrole pigment. The crystal modification of the thus-obtained dichlorodiketopyrrolopyrrole pigment was the α modification, the BET specific surface area was 94 m²/g, and the standard deviation showing the degree of particle size control was 8.01.

COMPARATIVE EXAMPLE 3

90 g of crude dichlorodiketopyrrolopyrrole pigment having been produced in the same manner as in Comparative Example 2 was added to a 3-L kneader together with 1,500 g of sodium chloride having been pulverized to an average particle size of 20 μm and dried. 10 g of the following diketopyrrolopyrrole derivative and 240 g of diethylene glycol were added thereto with controlling a heat medium at 50° C. and, after forming the preferable condition of mixture, milling was initiated. After milling for 10 hours, the content was added to 10 times by weight of water, followed by stirring. After dissolving sodium chloride and diethylene glycol, the mixture was filtered and purified to separate the pigment. This water-containing wet cake was heat-treated in an oven at 80° C. for 24 hours to dry till the water content thereof became less than 1% by weight, and then grinded in a hammer mill type grinder machine. The grinded product was passed through a 5-mm screen to obtain dichlorodiketopyrrolopyrrole pigment. The crystal modification of the thus-obtained dichlorodiketopyrrolopyrrole pigment was the α modification, the BET specific surface area was 111 m²/g, and the standard deviation showing the degree of particle size control was 7.96.

Diketopyrrolopyrrole derivative (Evaluation of Color Filter Characteristics of the Pigments Obtained in Examples and Comparative Examples)

Chromaticity, lightness and contrast ratio were measured for the pigments obtained in Examples and Comparative Examples. In these evaluations, pigment dispersion pastes were first prepared, and then light-sensitive coloring compositions were prepared using respective pigment dispersion pastes. Subsequently, each of the light-sensitive coloring compositions was coated on a glass substrate using a spin coater, and light-exposed and heated. Chromaticity, lightness and contrast ratio were measured for each of the thus coated substrates. Evaluation methods are described in detail below.

(Preparation of a Pigment Paste)

Each of the pigments obtained in Examples and Comparative Examples was mixed with a resin type pigment dispersant, acrylic resin for evaluation, and an organic solvent according to the following formulation, and the mixture was dispersed at 320 rpm for 4 hours in a planetary ball mill (planetary ball mill P-5 manufactured by Fritsch Japan Co., Ltd.) using 290 g of zirconia beads of 0.5 mm in diameter to prepare a pigment paste.

| Compounding component | Amount |
| --- | --- |
| Pigment obtained in Example or Comparative Example | 17.3 g |
| 30% Solution of Ajisper PB821 (manufactured by Ajinomoto Co., Ltd.) in cyclohexanone | 5.8 g |
| Acrylic resin for evaluation (solid content: 20%) | 62.1 g |
| Cyclohexanone | 54.8 g |

800 Parts by weight of cyclohexanone was placed in a reaction vessel and was heated to 100° C. with introducing a nitrogen gas into the vessel and, at the same temperature, a mixture of the following monomers and the thermal polymerization initiator was dropwise added thereto over 1 hour to conduct polymerization reaction.

| | |
| --- | --- |
| Styrene | 60 parts by weight |
| Methacrylic acid | 60 parts by weight |
| Methyl methacrylate | 65 parts by weight |
| Butyl methacrylate | 65 parts by weight |
| Azobisisobutyronitrile | 10 parts by weight |

After completion of the dropwise addition, the reaction was continued for further 3 hours at 100° C., a solution of 2 parts of azobisisobutyronitrile in 50 parts by weight of cyclohexanone was added thereto, followed by continuing the reaction for further 1 hour at 100° C. to synthesize a resin solution. After cooling to room temperature, 2 g of the resin solution was sampled and heat-dried at 180° C. for 20 minutes to measure non-volatile components. Cyclohexanone was added so that the content of the non-volatile components in the formerly synthesized resin solution became 20% by weight, thus an acrylic resin solution for evaluation being prepared.

(Preparation of a Light-Sensitive Coloring Composition)

Each of the pigments obtained in Examples and Comparative Examples was compounded as shown below and, after uniformly mixing by stirring, the mixture was filtered through a 1-μm filter to prepare an alkali-developable light-sensitive coloring composition. The viscosity of each of the thus-obtained coloring compositions was measured at 60 rpm using a B-type viscometer (manufactured by Tokyo Keiki). Results are shown in Table 1. Additionally, in the table, unit of the viscosity is mPa·s.

| Composition component | Amount |
| --- | --- |
| Pigment dispersion described above | 36.4 parts by weight |
| Acrylic resin solution for evaluation | 5.6 parts by weight |
| Trimethylolpropane triacrylate (NK Ester ATMPT manufactured by Shin-Nakamura Chemical Co., Ltd.) | 5.4 parts by weight |
| Photo polymerization initiator (Irgacure 907 manufactured by Ciba Specialty Chemicals) | 0.3 part by weight |

-continued

| Composition component | Amount |
|---|---|
| Sensitizing agent (EAB-F manufactured by Hodogaya Chemical Co., Ltd.) | 0.2 part by weight |
| Cyclohexanone | 52.1 parts by weight |

(Coating of the Light-Sensitive Coloring Composition and Evaluation of Color Filter Characteristics)

Colored films were prepared according to the following method using the thus-obtained light-sensitive coloring compositions. That is, each of the obtained light-sensitive coloring compositions was coated on a 100 mm×100 mm×1.1 mm (in thickness) glass substrate using a spin coater at such a rotation number that the chromaticity (x) of the colored film became 0.64. Subsequently, the coated composition was dried at 140° C. for 20 minutes, and then irradiated with UV rays in an integrated radiation dose of 150 mJ with a high-pressure mercury lamp to prepare a colored film. Lightness (Y) and contrast ratio (CR ratio) of each colored film were measured. The lightness (Y) was measured by means of a spectrophotometer (U-3500 manufactured by Hitachi Ltd). The contrast ratio (CR ratio) was measured by means of a contrast tester (CT-1BF manufactured by Tsubosaka Denki). Results are shown in Table 1.

TABLE 1

| | BET Specific Surface Area ($m^2/g$) | Standard Deviation | Viscosity | Lightness (Y) (x = 0.64) | CR Ratio (x = 0.64) |
|---|---|---|---|---|---|
| EXAMPLE-1 | 121 | 7.03 | 20 | 21.9 | 2422 |
| EXAMPLE-2 | 118 | 7.05 | 20 | 21.9 | 2382 |
| EXAMPLE-3 | 110 | 7.12 | 20 | 21.9 | 2204 |
| EXAMPLE-4 | 142 | 4.09 | 20 | 21.5 | 3050 |
| EXAMPLE-5 | 125 | 4.15 | 16.5 | 21.4 | 2902 |
| EXAMPLE-6 | 131 | 4.23 | 16 | 21.8 | 2871 |
| COMPARATIVE EXAMPLE-1 | 73 | 8.79 | 16 | 21.8 | 710 |
| COMPARATIVE EXAMPLE-2 | 94 | 8.01 | 17 | 21.9 | 1808 |
| COMPARATIVE EXAMPLE-3 | 111 | 7.96 | 17 | 21.4 | 2120 |

As has been described in each Example, dichlorodiketopyrrolopyrrole pigment of the α modification can be obtained by wet milling crude dichlorodiketopyrrolopyrrole pigment wherein the α modification and the β modification coexist. It is seen from Table 1 that the dichlorodiketopyrrolopyrrole pigment of the invention having the α modification and obtained by wet milling crude dichlorodiketopyrrolopyrrole pigment wherein the α modification and the β modification coexist has a larger BET specific surface area and a smaller standard deviation than those of the α modification of Comparative Examples obtained by wet milling crude dichlorodiketopyrrolopyrrole pigment composed of only the α modification or only the β modification, thus being found to be a fine and highly size-controlled dichlorodiketopyrrolopyrrole pigment. In addition, since dichlorodiketopyrrolopyrrole pigment of the invention having the α modification has undergone highly progressed size controlling, it can form a coating solution with a low viscosity in spite of its fine particle size. Thus, it is seen that it has excellent coating properties and, in addition, that a colored film formed by using the dichlorodiketopyrrolopyrrole pigment of the invention having the α modification has a higher contrast ratio and a higher lightness than those of the colored film formed by using the dichlorodiketopyrrolopyrrole pigment of the Comparative Example having the α modification, thus being excellent as a pigment for color filter.

What is claimed is:

1. A process for producing dichlorodiketopyrrolopyrrole pigment of the α modification, which comprises wet milling crude dichlorodiketopyrrolopyrrole pigment wherein an α modification and a β modification coexist in the presence of a milling agent and a wetting agent.

2. The process for producing the dichlorodiketopyrrolopyrrole pigment of the α modification according to claim 1, wherein in measurement of powder X-ray diffraction using a CuKα ray, $I_\beta/(I_\alpha+I_\beta)$ is from 0.08 to 0.90 wherein $I_\alpha$ represents an intensity at a Bragg angle (2θ) of 28.1±0.3° characteristic of the α modification in the crude dichlorodiketopyrrolopyrrole pigment and $I_\beta$ represents an intensity at a Bragg angle (2θ) of 27.0±0.3° characteristic of the β modification in the crude dichlorodiketopyrrolopyrrole pigment.

3. The process for producing the dichlorodiketopyrrolopyrrole pigment of the α modification according to claim 1, wherein the crude dichlorodiketopyrrolopyrrole pigment is a product obtained by reacting a succinic acid diester with an aromatic nitrile in an organic solvent.

4. The process for producing the dichlorodiketopyrrolopyrrole pigment of the α modification according to claim 1, wherein wet milling is performed at a temperature of 20° C. to 150° C.

5. The process for producing the dichlorodiketopyrrolopyrrole pigment of the α modification according to claim 1, wherein the amount of the milling agent is from 0.5 to 50 times by weight of the crude dichlorodiketopyrrolopyrrole pigment.

6. The process for producing the dichlorodiketopyrrolopyrrole pigment of the α modification according to claim 1, wherein the amount of the wetting agent is from 0.1 to 10 times by weight of the crude dichlorodiketopyrrolopyrrole pigment.

7. The process for producing the dichlorodiketopyrrolopyrrole pigment of the α modification according to claim 1, wherein wet milling is performed in the presence of a dye derivative.

8. The process for producing the dichlorodiketopyrrolopyrrole pigment of the α modification according to claim 7, wherein the dye derivative to be used in wet milling is at least one dye derivative selected from among diketopyrrolopyrrole dye derivatives, quinacridone dye derivatives and azo dye derivatives.

9. Dichlorodiketopyrrolopyrrole pigment of α modification, comprising:

a crude dichlorodiketopyrrolopyrrole pigment;

a milling agent; and a wetting agent, wherein a measurement of powder X-ray diffraction using a CuKα ray, $I_\beta/(I_\alpha+I_\beta)$ is from 0.08 to 0.90, the $I_\alpha$ represents an intensity at a Bragg angle (2θ) of 28.1±0.3° characteristic of the α modification in the crude dichlorodiketopyrrolopyrrole pigment and the $I_\beta$ represents an intensity at a Bragg angle (2θ) of 27.0 ±0.30° characteristic of the β modification in the crude dichlorodiketopyrrolopyrrole pigment.

10. Dichlorodiketopyrrolopyrrole pigment of α modification according to claim 9, wherein a BET specific surface area thereof is from 80 m²/g to 15 m²/g.

11. A coloring composition, which contains the pigment described in claim 9 and a pigment carrier.

* * * * *